United States Patent [19]

Janicki et al.

[11] 4,398,137

[45] Aug. 9, 1983

[54] CONTROL PROVISIONS FOR SERVO COMPONENT AT PRINTING OR BINDING MACHINES

[75] Inventors: Max Janicki; Hans-Georg Liefke; Reinhart Keil; Gerd Geyer, all of Leipzig, German Democratic Rep.

[73] Assignee: VEB Kombinal Polygraph "Werner Lamberz" Leipzig, Leipzig, German Democratic Rep.

[21] Appl. No.: 250,702

[22] Filed: Apr. 3, 1981

[30] Foreign Application Priority Data

Oct. 4, 1980 [DD] German Democratic Rep. .... 220350

[51] Int. Cl.[3] .............................................. G05B 19/28

[52] U.S. Cl. .................................. 318/601; 318/567; 318/609

[58] Field of Search ........................ 318/601, 567, 609

[56] References Cited

U.S. PATENT DOCUMENTS

| | | | |
|---|---|---|---|
| 3,523,229 | 8/1970 | Black et al. | 318/601 |
| 3,675,107 | 7/1972 | Barber | 318/601 |
| 3,760,251 | 9/1973 | Posi et al. | 318/601 |
| 3,793,511 | 2/1974 | Bala et al. | 318/601 |
| 3,962,620 | 6/1976 | Dion | 318/601 |
| 4,340,848 | 7/1982 | Hanagata et al. | 318/601 |

*Primary Examiner*—B. Dobeck
*Attorney, Agent, or Firm*—Michael J. Striker

[57] ABSTRACT

A regulating device for servo components such as for example inking, dampening, format setting or deckle size setting screws employed at printing and binding machines for regulating deviations from set points. A measuring device for determining the position of the servo component is followed by a storage for actual setting values having its output connected to a comparison circuit. A second input of the comparison circuit is connected to a storage for set point values and the output of the comparison circuit is connected via a control circuit to the servo component. The storage for actual setting values is connected via a decoder to a display unit. A carrier for set point value data is connected to the storage for set point values. A clock generator is connected to the inputs of the storage for set point values and to the storage for actual setting values.

10 Claims, 2 Drawing Figures

CONTROL PROVISIONS FOR SERVO COMPONENT AT PRINTING OR BINDING MACHINES

BACKGROUND OF THE INVENTION

1. Field of the Invention

The present invention relates to control provision, regulating device and method for controlling servo components such as for example inking, dampening, format setting and deckle size setting screws employed at printing and binding machines for deviation control of set point deviations.

2. Brief Description of the Background of the Invention Including Prior Art

A device for control and regulation of the provision of ink at printing machines is known from German Auslegeschrift DE-AS No. 2,728,738, where for the control of the servo components there is provided a compound system of microcomputers. The total apparatus is used during the necessary control time at the control and respectively regulation of each ink metering element for the control of the color density measuring apparatus, for the collection of the measured values, for the transfer to a central processor, for the accepting of the position of the ink metering elements by a further computer, for the calculation of the setting of the new position of the ink metering element and for the transformation of the setting order into control signals by a third computer. Position deviations of the servo component induced by changes of the parameters during the printing process are measured with displacement pickups and fed to a computer. The computer causes an alarm to occur upon deviations from the set point value. The positions of the servo components are scanned after a predetermined time after the setting of the set point value.

In case of set point deviations spoilage and waste paper is produced during this time. The total apparatus is involved for the time of from the control of the position to the occurring of the alarm.

SUMMARY OF THE INVENTION

1. Purposes of the Invention

It is an object of the present invention to provide a control provision for servo components at printing and binding machines employing a shorter control response time and a simplified construction.

It is another object of the present invention to provide such a control provision for regulating position deviations of the servo components immediately and independent from each other with a short response time of the regulating mechanism and with increased reliability.

It is another object of the present invention to provide a control provision for printing machines which allows to minimize the production of spoilage, waste paper and maculature.

These and other objects and advantages of the present invention will become evident from the description which follows.

2. Brief Description of the Invention

The present invention provides a regulating device for a servo component which comprises a measuring device for determination of the actual setting of the servo component, a storage for actual setting values, which is connected to the measuring device, a storage for set point values, a comparison circuit connected to the storage for actual setting values and to the storage for set point values, and a control circuit having an input connected to the comparison circuit and having an output connected to the servo component.

A set point value carrier can be connected to the storage for set points. Such set point carrier can be a manually operated device, an electromechanical or an electronically operated device such as for example a punched tape reader. A clock generator can be provided, which is connected to the storage for actual setting values and to the storage for set point values. The storage for actual setting values can coincide with the measuring device. The control circuit can comprise a digital to analog converter. The comparison circuit can be an expanded non-equivalence or antivalence circuit. The expanded non-equivalence circuit can comprise a digital to analog converter in parallel to the non-equivalence function. A decoder can be connected to the storage for actual setting values and a display can be connected to the decoder. The storage for actual setting values, the storage for set point values, the comparison circuit, the control unit and the decoder can be provided as an integrated circuit. The display unit can be provided as a diode display. The measuring device can be an incremental feed. Scanning code disks can be coordinated to the storage for actual setting values.

There is also provided a method for controlling a servo component which comprises measuring the actual value of the setting of the servo component, storing the actual setting value in a storage for actual setting values, storing set point values in a storage for set point values, comparing the actual values with the set point values for obtaining a deviation signal, and controlling the servo component by using the deviation signal in a control circuit for the servo component.

The stored actual values can be decoded to provide decoded values and the decoded values can be displayed. The set point values can be provided from a set point value carrier to the storage for set point values. The storage for actual setting values and the storage for set point values can be clocked with signals from a clock generator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

In the accompanying drawings in which is shown one of the various possible embodiments of the invention

DESCRIPTION OF INVENTION AND PREFERRED EMBODIMENTS

Figure 1:
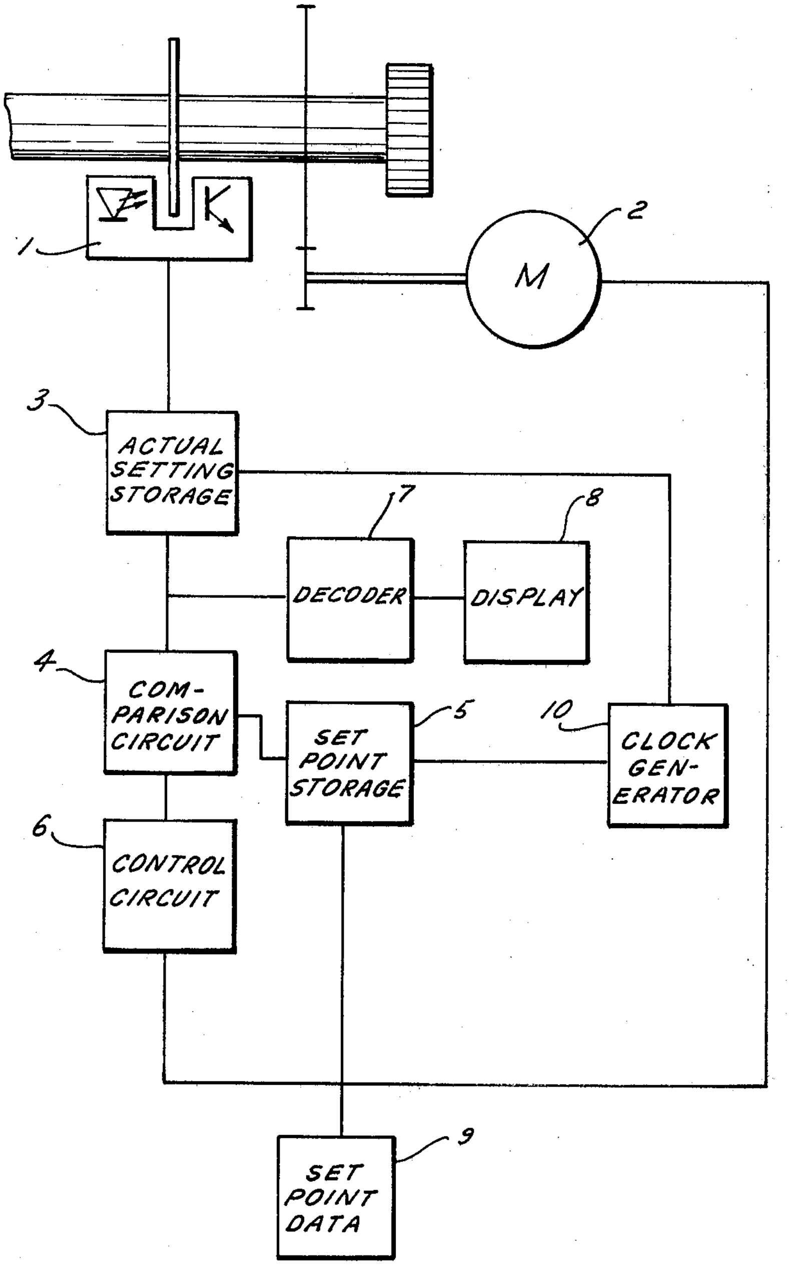
FIG. 1 is a view of a schematic diagram of the control device.

In accordance with the present invention, there is provided a measuring device for determining the positions of the servo components and the measuring device is connected to an actual setting value storage having its output connected to a comparison circuit. A second input of the comparison circuit is connected to a set point value storage and the output of the comparison circuit is connected via a control circuit to the servo component. The storage for actual setting values is connected via a decoder to a display unit. A clock generator is connected to the storage for actual setting values and to the storage for set point values. A set point value data carrier is connected to an input of the storage for set point values. The control circuitry can be simplified in case the storage for actual setting values is identical with the measuring device. It is advantageous for controlling of the servo components if the control device comprises a digital to analog converter. The comparison of actual setting value and of set point value as well as the recognition of the sign are advantageously effected by providing the comparison circuit as an expanded non-equivalence circuit or as an antivalence circuit. A saving of space and an increase in reliability of the apparatus can be achieved by providing an integrated circuit comprising the storage, the comparison circuit, the control circuit and the decoder. An accurate digital position determination can be achieved by employing an incremental feed as a measuring device. The absolute indication of the deviation of the position is advantageously provided such that the display unit is constructed as a diode display. Advantageously, the incremental feed is provided such that scanning code disks are coordinated to the storage for the actual setting values. It is advantageous for a simplified provision of the expanded non-equivalence circuit if the non-equivalence circuit comprises a digital to analog converter coordinated in parallel to the antivalence circuit proper.

The regulating device of the present invention adjusts deviations of position immediately and automatically and the absolute value of the deviation is indicated by a display unit. The reliability is increased by way of the simpler construction of the control device and the electronic calculators are relieved.

In conventional control provisions for servo components the computers contained therein are also employed for the control of deviations in position. The deviations of the positions caused by changes of certain parameters during the printing process are scanned after a predetermined time, are compared with the set point values and are provided as a signal. During the time from the beginning of the deviation of position until its elimination spoilage and waste paper are produced. Since for the regulation process the total apparatus is required, the computers are working to the end of the regulating process.

In accordance with the present invention one of the described regulating devices is coordinated to each servo component. The start of the regulating process occurs automatically upon the appearance of the deviation in position. Therefor, it is not possible that larger deviations occur. The construction of the regulating device is as follows.

Referring now to FIG. 1 an incremental feed 1 conducts the actual setting values of the servo motor 2 to the storage for actual setting values 3. The storage for actual setting values 3 stores this value and feeds it to the input of the expanded non-equivalence circuit 4. In this circuit the actual setting value is compared to the set point value and the signal of the deviation is determined. The set point value is fed from the storage for set point values 5 to the expanded non-equivalence circuit 4. The output value of the expanded non-equivalence circuit 4 passes via the motor control circuit 6 to the servo motor 2 and effects the adjustment of the position of the motor until the deviation of position is eleminated.

The storage for the actual setting values 3 feeds via the decoder 7 at the same time the value of the deviation to the diode display 8. The diode display 8 shows the absolute value of the position deviation. By way of this display provision a non-correctable deviation such as for example failure of the servo motor 2 or the like is indicated.

The input of the set point values into the storage for set point values 5 is provided from a carrier for set point value data 9 or from a computer of a preceeding device. For preventing interference such as generated for example by external electromagnetic fields or the like, a clock generator 10 is connected to the two storage units.

Additional embodiments of the measuring device can comprise an angle coding provision or a potentiometric displacement pickup with an analog to digital converter.

Screens with column diagram, light spot indicators as well as indicator instrument displays can be employed for the display unit.

The comparison between the actual setting values and the set point values is performed in the comparison circuit. The comparison circuit is provided as an expanded non-equivalence circuit 4.

Figure 2:
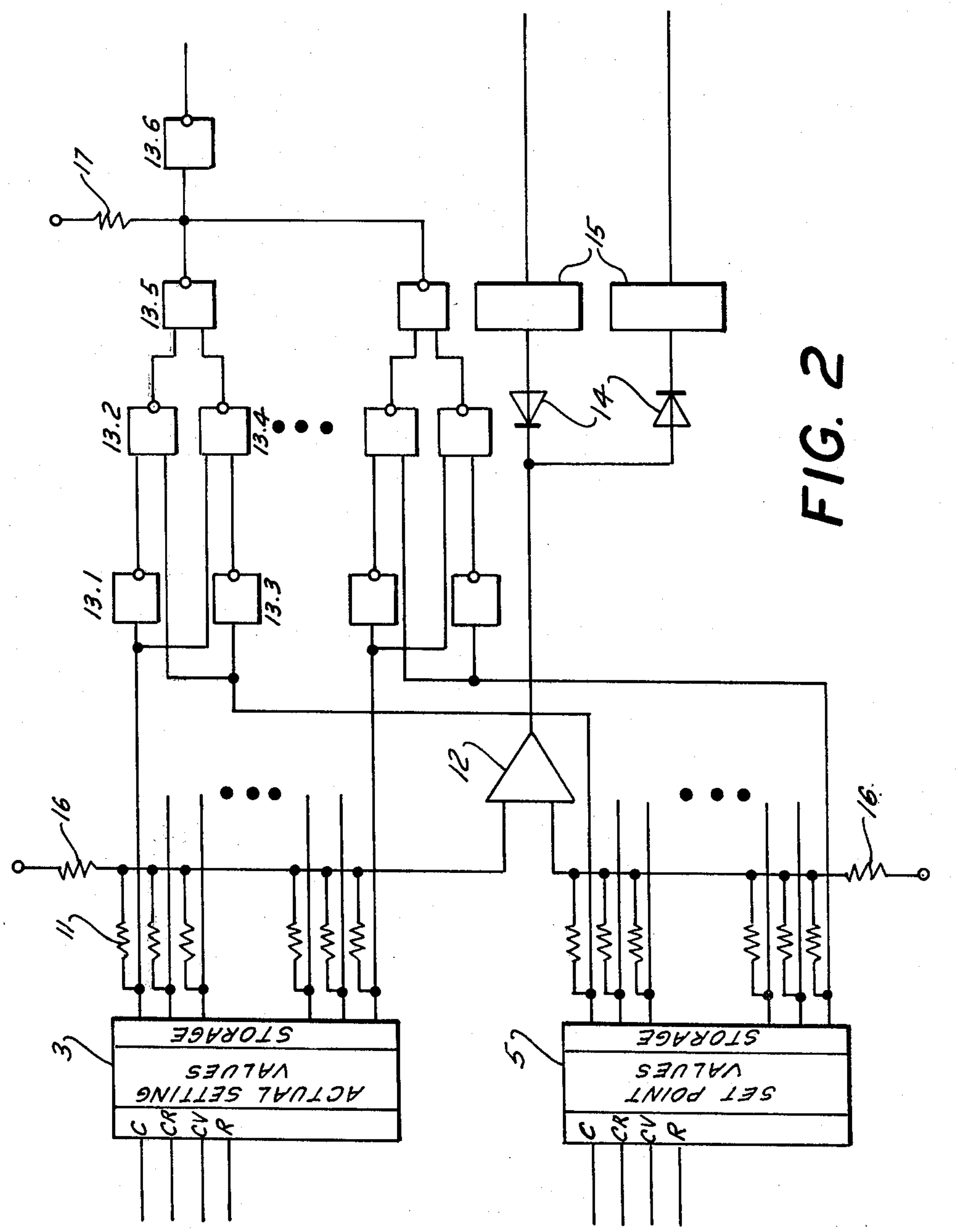
FIG. 2 is a view of a circuit diagram with actual setting value storage and set point value storage.

Referring now to FIG. 2 there is shown the comparison circuit with the storage for actual setting values 3 and the storage for set point values 5. The comparison circuit operates as follows.

The actual setting values and the set point values are entered into the two storage units and pass via a digital to analog converter to the non-equivalence circuit. The digital to analog converter is constructed in the way of a step recorder and comprises the input resistors 11, the operational amplifier 12 and the drop resistors 16. Here an input resistor 11 is coordinated to each output of the storage units. Corresponding to the occupation of the storage outputs with a 1-signal corresponding to a dual place value the signals are transformed via different size input resistors 11 into analog voltage values. The actual setting values and the set point values this way pass separately to an input in each case of the operational amplifier 12. The operational amplifier 12 generates the difference of the two values together with the sign, amplifies the same and feeds it on via the diode 14 and the following amplifier 15. The diodes 14 serve to separate the positive and the negative difference of the set point values and the actual setting values. The difference values are amplified via the amplifiers 15 and then serve as a signal for control of the direction of rotation of the servo motor 2. The absolute value of the necessary adjustment is determined by the non-equivalence circuit 4. The non-equivalence circuit comprises the NAND gates 13.1, 13.3 and 13.5.

In each case one non-equivalence circuit compares the two outputs of the two storage units, which have the same dual place value. An analog total signal corresponding to the absolute value of the deviation of position results from the connection on the output side of all non-equivalence circuits.

The drop resistors 16 and 17 serve as voltage supplies of the expanded non-equivalence circuit. The NAND gate 13.6 serves to negative the output signal.

It will be understood that each of the elements described above, or two or more together, may also find a useful application in other types of system configurations and servo control situations differing from the types described above.

While the invention has been illustrated and described as embodied in the context of a servo control device, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A regulating device for servo component, comprising a servo component, a measuring device for determination of the actual setting of the servo component;

a storage for actual setting values connected to the measuring device;

a storage for set point values;

a comparison circuit connected to the storage for actual setting values and to the storage for set point values and operative for obtaining a deviation signal;

a set point value carrier connected to the storage for set points;

a clock generator connected to the storage for actual setting values and to the storage for set point values;

a decoder connected to the storage for actual setting values;

a display unit connected to the decoder; and a control circuit having an input connected to the comparison circuit and having an output connected to the servo component and operative for controlling the servo component by using the deviation signal.

2. The regulating device for servo components according to claim 1 where the storage for actual setting values coincides with the measuring device.

3. The regulating device for servo component according to claim 1 wherein the control circuit comprises a digital to analog converter.

4. The regulating device for servo component according to claim 1 wherein the comparison circuit is an expanded non-equivalence circuit.

5. The regulating device for servo component according to claim 4 wherein the expanded non-equivalence circuit comprises a digital to analog converter in parallel to the non-equivalence function.

6. The regulating device for servo component according to claim 1 wherein the storage for actual setting values, the storage for set point values, the comparison circuit, the control unit and the decoder are provided as an integrated circuit.

7. The regulating device for servo component according to claim 1 wherein the display unit is provided as a diode display.

8. The regulating device for servo component according to claim 1 wherein the measuring device is an incremental feed.

9. The regulating device for servo component according to claim 1 wherein scanning code disks are coordinated to the storage for actual setting values.

10. A method for controlling servo component comprising measuring the actual value of the setting of the servo component;

storing the actual setting value in a storage for actual setting values;

storing set point values in a storage for set point values;

comparing the actual values with the set point values for obtaining a deviation signal;

providing set point values from a set point value carrier to the storage for set point values;

decoding the stored actual values to provide decoded values and displaying the decoded values;

clocking the storage for actual values and the storage for set point values with signals from a clock generator; and controlling the servo component by using the deviation signal in a control circuit for the servo component.

* * * * *